US008056773B2

(12) United States Patent
Van der Klaauw et al.

(10) Patent No.: US 8,056,773 B2
(45) Date of Patent: Nov. 15, 2011

(54) ASSEMBLY OF A TAPPING KEG WITH A NECK AND A CONNECTING DEVICE AND PARTS THEREFOR

(75) Inventors: Guido Petrus Johannes Van der Klaauw, Hilversum (NL); Bart Jan Bax, The Hague (NL)

(73) Assignee: Heineken Technical Services B.V., Amsterdam (NL)

( * ) Notice: Subject to any disclaimer, the term of this patent is extended or adjusted under 35 U.S.C. 154(b) by 752 days.

(21) Appl. No.: 10/508,280

(22) PCT Filed: Mar. 19, 2003

(86) PCT No.: PCT/NL03/00205

§ 371 (c)(1),
(2), (4) Date: Feb. 22, 2005

(87) PCT Pub. No.: WO03/078297

PCT Pub. Date: Sep. 25, 2003

(65) Prior Publication Data

US 2005/0127111 A1 Jun. 16, 2005

(30) Foreign Application Priority Data

Mar. 19, 2002 (NL) ...................................... 1020202

(51) Int. Cl.
*B65D 83/00* (2006.01)
*F16K 43/00* (2006.01)

(52) U.S. Cl. .................. 222/400.7; 222/400.8; 222/399; 137/317; 137/322

(58) Field of Classification Search ............... 222/400.7, 222/400.8, 399; 137/317, 318, 319, 320, 137/321, 322, 323, 324, 325
See application file for complete search history.

(56) References Cited

U.S. PATENT DOCUMENTS 193,676 A * 7/1877 Sperry .......................... 137/321
346,438 A * 7/1886 Gillette et al. ................ 137/321
767,658 A * 8/1904 Pentlarge et al. ............. 137/325
780,125 A * 1/1905 Pentlarge ...................... 137/325
2,790,571 A * 4/1957 Flaith et al. ...................... 217/99
3,473,556 A * 10/1969 Marine et al. ................. 137/322
4,291,821 A * 9/1981 Nezworski ............... 222/153.04
4,305,421 A * 12/1981 Fallon ........................... 137/322
4,715,414 A * 12/1987 Harrison et al. ........... 222/400.8

(Continued)

FOREIGN PATENT DOCUMENTS

DE 95 558 C 1/1898

(Continued)

*Primary Examiner* — Kevin P Shaver
*Assistant Examiner* — Stephanie E Williams
(74) *Attorney, Agent, or Firm* — Pearne & Gordon LLP

(57) ABSTRACT

An assembly of a tapping keg with neck and a connecting device for placement on the neck. In the neck is at least one valve. The neck is provided with an outwardly reaching flange with a top surface and an inclined bottom surface. The bottom surface is inclined with respect to the top surface. The connecting device has a substantially horse shoe-shaped connecting element, provided with a slot by way of which the connecting element is slidable over the flange. The side of the slot facing the bottom surface during use includes a lower surface which is inclined at an angle which is at least virtually equal to the angle of inclination of the inclined bottom surface and, in coupled condition, abuts at least against a planar central part of the inclined bottom surface.

10 Claims, 5 Drawing Sheets

U.S. PATENT DOCUMENTS

| | | | | | |
|---|---|---|---|---|---|
| 4,717,048 | A | | 1/1988 | Stenger | |
| 4,728,010 | A | * | 3/1988 | Johnston | 222/397 |
| 4,736,926 | A | * | 4/1988 | Fallon et al. | 251/149.9 |
| 4,834,266 | A | * | 5/1989 | Brewer et al. | 222/147 |
| 5,145,096 | A | | 9/1992 | Stenger | |
| 5,511,692 | A | * | 4/1996 | Willingham | 222/1 |
| 5,617,977 | A | * | 4/1997 | Augustinus | 222/400.7 |
| 5,645,192 | A | * | 7/1997 | Amidzich | 222/1 |
| 5,690,136 | A | * | 11/1997 | Celli | 137/212 |
| 5,901,747 | A | * | 5/1999 | Rokkjaer | 137/614.2 |
| 6,105,825 | A | * | 8/2000 | Gomi et al. | 222/146.6 |
| 6,308,869 | B1 | * | 10/2001 | Simpson | 222/400.7 |
| 2002/0074352 | A1 | * | 6/2002 | Till | 222/148 |
| 2004/0045988 | A1 | * | 3/2004 | van der Klaauw et al. | 222/400.7 |

FOREIGN PATENT DOCUMENTS

| | | | | | |
|---|---|---|---|---|---|
| GB | 2184103 | A | * | 6/1987 | 222/400.7 |
| WO | WO 01 79109 | A | | 10/2001 | |
| WO | WO 02 14209 | A | | 2/2002 | |

* cited by examiner

ASSEMBLY OF A TAPPING KEG WITH A NECK AND A CONNECTING DEVICE AND PARTS THEREFOR

The invention relates to an assembly of a tapping keg with a neck and a connection device.

Tapping kegs such as beer kegs are usually connected to a tapping device with the aid of a handle-tapping head. To that end, the handle-tapping head is provided with a supply duct for carbon dioxide under pressure, a discharge duct for beer from the tapping keg and a connecting element for coupling the handle-tapping head to the tapping rod. The handle-tapping head has been secured in the tapping rod under inwardly extending projections, usually designated as lugs. In another embodiment, the tapping rod is provided with an outwardly extending flange, while the handle-tapping head is provided with a connecting element provided with a groove, which extends on the inside thereof and by way of which the connecting element can be slid over the flange. Thereupon, a pressure body, which forms an integral part of the handle-tapping head, can be pressed down with the aid of a handle, against a valve assembly provided in the tapping rod, for opening same. The handle-tapping head is thereby pushed up slightly and clamped against the flange. Through the pressure body, $CO_2$ gas is supplied to and beverage is discharged from the inner space of the tapping keg.

In this known assembly, different tapping kegs and different tapping heads can be combined. The pressure body operatively seals against the different valves of the valve assembly. As a consequence of the space that exists in these known assemblies between the walls of the groove and the flange of the tapping rod, the connecting device may easily be mounted askew to some extent, at least be positioned inaccurately, thereby giving rise to the risk of the connecting device being damaged and even becoming detached unintentionally, specifically because as a result of the configuration of the tapping rod, flange and groove, there is only a relatively small contact surface between the connecting element and the tapping rod, during use with pressed-down pressure body.

All known assemblies involve the disadvantage that the tapping rod, together with the connecting device, may become detached from the tapping keg, which may lead to dangerous situations.

An object of the invention is to provide an assembly of a tapping keg and a connecting device, in which the above-mentioned disadvantages are at least partly avoided, while maintaining the advantages thereof.

In particular, the invention contemplates an assembly of a tapping keg and a connecting device that enables a relatively simple and accurate fitting of the connecting device onto the tapping keg, without damage, and whereby virtually automatically an optimum positioning is obtained.

A further object of the invention is to provide an assembly of a tapping keg and a connecting device in which, in coupled condition, there is a relatively large contact surface between the connecting element and a flange on which it is secured.

These and other advantages are achieved with an assembly according to the invention, characterized by the features according to claim 1.

In a tapping keg according to the invention, the flange is designed such that the contact surface between the connecting device and the flange, at least during use and with the valve open, is relatively large, while the occurring forces, owing to the inclined contact surfaces, are suitably taken up and transmitted. Due to the inclined surfaces being in mutual abutment, moreover, a proper connection and centering is obtained of the connecting device with respect to the neck and hence with respect to the or each valve. The connecting device, as far as necessary, will be self-locating. By providing the inclined surface on the bottom side of the flange, that is, on the side remote from the top surface of the neck, the additional advantage is achieved that the tapping keg is applicable with standard filling heads.

The neck of a tapping keg according to the invention, at least as far as the flange is concerned, is preferably dimensioned such that a longitudinal cross section comprising the longitudinal axis of the neck fits within a comparable longitudinal cross section of an existing, standard neck. A neck for a tapping keg according to the invention can preferably be obtained by material-removing machining of an existing, standard neck, at least tapping keg, all in such a manner that adapted connecting devices according to the invention fit onto a neck according to the invention, standard filling devices and washing devices can be used for cleaning and filling the tapping kegs and moreover standard tapping rods can be applied. Moreover, waste is prevented because the thus adapted tapping kegs can still be used in existing tapping devices.

In a particularly advantageous embodiment, directly under the flange, on the outer side of the neck, a groove is provided, in which, in coupled condition, a part of the connecting element extends. Thus, the use of an incorrect connecting device with a tapping keg, at least neck, according to the invention can be prevented still better. Moreover, in this way, the contact surface is enlarged still further.

The cross section of the neck adjacent the groove, when the neck is approximately cylinder-shaped, is preferably between 52 and 56 mm, measured adjacent the bottom of the groove, the groove preferably having a depth, measured in a direction at right angles to the longitudinal axis of the neck, of minimally 5 mm. The bottom is here to be viewed as the circumferential surface extending parallel to the longitudinal axis of the neck and forming a wall of the groove. It is precisely with such dimensions that the advantage is achieved that a typical conventional filling device is usable, that moreover a typical conventional tapping rod, that is, riser pipe with valve assembly can be used in the neck and that moreover a suitable enlargement of the contact surface between the connecting element and the neck, in particular the flange, is obtained to come to an optimum force transmission. The angle of inclination of the inclined surface is then preferably between 45 and 10 degrees and is, in particular, about 25 degrees. It is precisely with such an angle, which is relatively acute, that a good centering is obtained. By moreover arranging for the inclined surface, at least the planar central part thereof, to extend into the groove, such that it forms a wall part thereof, a still greater contact surface is obtained, while the outside dimensions of the neck remain suitable for use with the above-mentioned filling device and tapping rod.

The slot of a connecting device according to the invention embraces the flange, at least the neck, preferably with a slight clearance, for instance between 0 and 0.9 mm between the inclined surfaces and between 0 and 2 mm between the bottom of the groove and the adjacent edge of the connecting element, measured when the connecting element rests on the top surface of the neck. In a preferred embodiment, these tolerance dimensions are preferably about 0.4 to 0.5 mm and about 0.6 mm, respectively. Such a close fit provides for a still better connection.

Preferably, in an assembly according to the invention, an intermediate body is provided, receivable between the connecting device and the or each valve. In particular suitable to that end is a device as described in Dutch patent application "Tapping rod", which is understood to be incorporated herein by reference. With such an intermediate body, it can be ensured that the connecting device is kept clean, free from contact with the beverage or other medium to be dispensed from the tapping keg.

The invention further relates to a tapping keg and connecting device for such a tapping keg, characterized by the features of claims 2 and 8, respectively.

In the subclaims, further advantageous embodiments are set forth of an assembly, tapping keg and connecting device according to the invention.

To clarify the invention, exemplary embodiments will be described with reference to the drawing. In the drawing.

Figure 1:
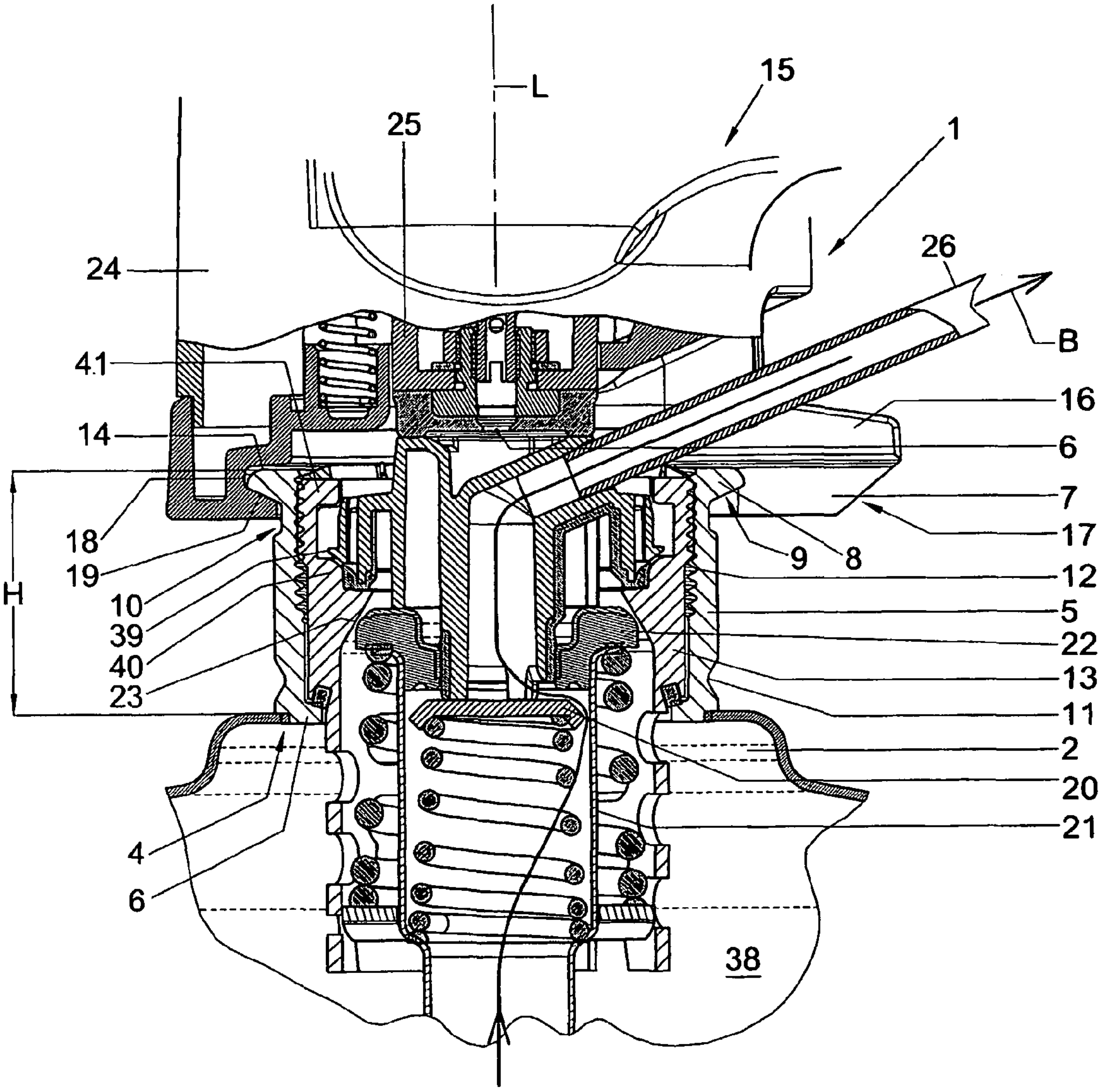
FIGS. 1 and 2 show, in sectional side elevation, a relevant portion of an assembly according to the invention in open and closed position, respectively.

In this description, the same or corresponding parts have the same or corresponding reference numerals. In the exemplary embodiments shown, there is each time shown a container manufactured substantially from metal, in particular steel, having a neck secured, in particular welded, therein. Into the neck a tapping rod has been screwed. Such a structure of a tapping keg is sufficiently known from practice. Such tapping kegs are used in particular for beer. It will be clear, however, that also other fixing methods and other applications are possible.

Figure 2:
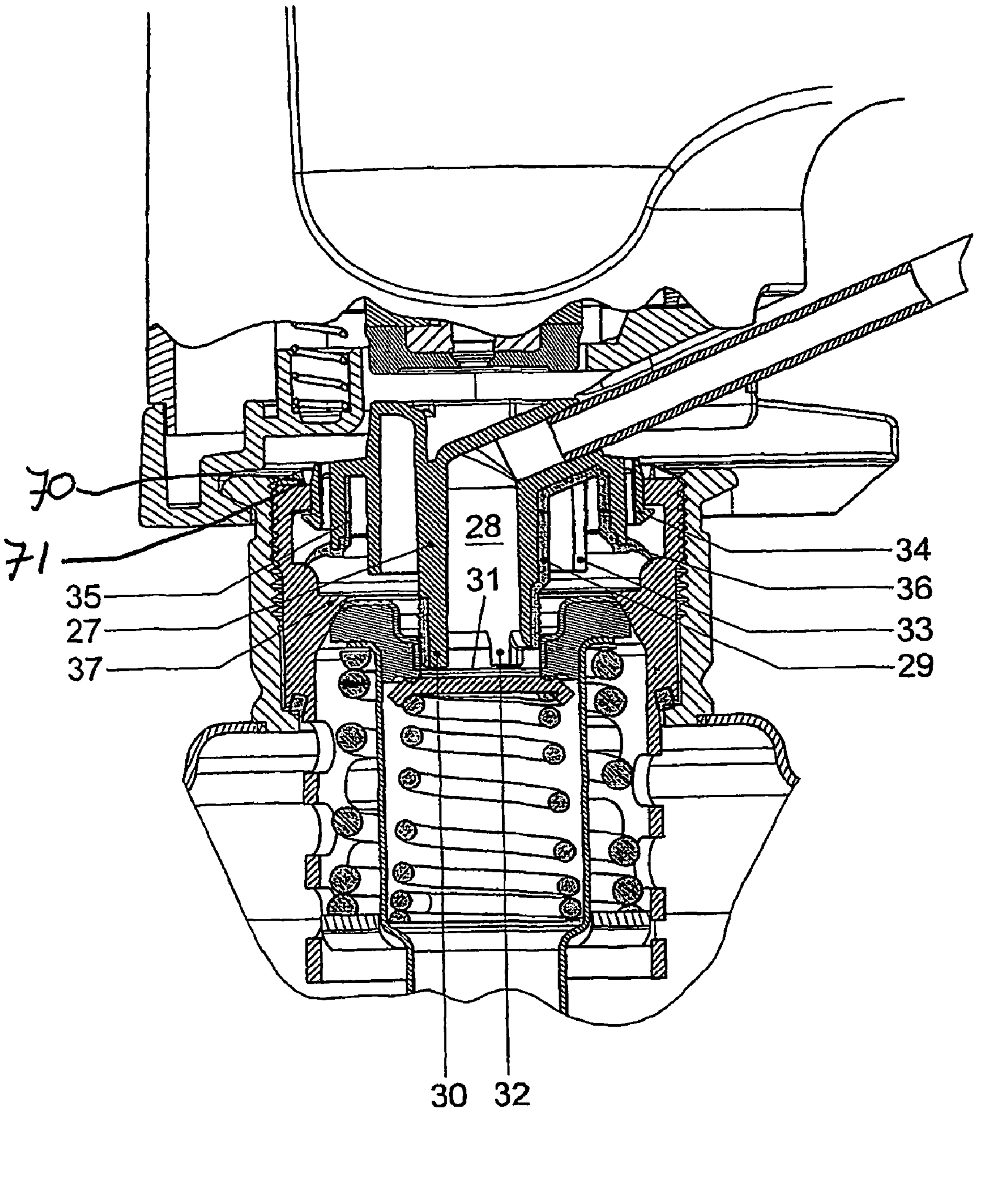

FIGS. 1 and 2 show a relevant portion of an assembly 1 according to the invention, comprising a keg 2 with a steel casing 3. Provided in the casing is an opening 4 in which a neck 5 has been secured, in particular welded-on, by a first end 6 thereof. The neck 5 extends outside the casing 3 over a height H and is substantially cylinder-shaped. At the second end 7, remote from the first end 6, an outwardly extending flange 8 is provided, which will be described in more detail hereinafter, in particular with reference to FIGS. 3, 4, 7 and 8. The flange 8 reaches outwards and is provided at the underside thereof with an inclined surface 9, which terminates in a circumferential groove 10. Provided in the outer surface of the neck 5, adjacent the first end 6, is a second groove 11 provided with a V-shaped cross section. Provided on the inner side of the neck 5 is internal screw thread 12, in which a tapping rod 13, substantially known per se, can be screwed, such that the top surface of the tapping rod 13 is situated under the end face 14 of the neck 5 that is defined by the second end 7. The inner thread 12 ends at a distance from the second groove 11. The second groove 11 provides for a barrier in the thermal conduction during the welding-on of the neck 5 to protect the inner thread 12 and the roundness of the respective part of the neck 5. For that matter, the second groove may also be omitted.

Onto the neck 5, in particular over the flange 8, a connecting device 15 has been slid, by way of a connecting element 16 which is substantially horse shoe-shaped, having an inner space or recess 17. A slot 18 is provided, open towards the U-shaped inner space 17. The slot 18 has a lower surface 19 which is inclined with respect to the longitudinal axis L of the neck 5 in coupled condition. The angles of inclination of the lower surface 19 and inclined surface 9 of the flange 8 are substantially equal to each other, such that in the coupled condition shown, a relatively large contact surface is obtained between the inclined surface 9 of the flange 8 and the lower surface 19. The angle of inclination has been chosen such that a centering action is thereby obtained for the connecting device 15, in particular the base 16 of the connecting device 15.

Provided in the tapping rod 13 are, known per se, a beer valve 20 in a riser pipe 21 and a gas valve 22 on top of the riser pipe 21. The gas valve 22 is substantially circular in top plan view, and is provided with a central opening which is closed off at the underside by the beer valve 20. The gas valve 22 has its upper/outer side in the closed condition abutting against an inclined seat 23 of the outer casing of the tapping rod 13 and has at least partly an elastic outer surface for obtaining a proper seal. In the embodiment shown in FIGS. 1 and 2, the connecting device 15 is designed as a gas pressure-controlled connecting device as described in the non-prepublished Dutch patent application NL 1017742, which is understood to be incorporated herein by reference. Depicted are the base 16, a portion of the housing 24 having therein an operating piston 25 through which gas under pressure can be supplied, as shown by the arrow G.

Included between the operating piston 25 and the valves 20, 22 is an intermediate body 27 with which the valves 20, 22 can be operated, so that the gas G can be brought past the gas valve and the seat 23 into the container 2, whilst beverage can be discharged from the container via the riser pipe 21 past the beer valve 20 through a beer duct 26, as indicated by the arrow B. An intermediate body 27 is described in more detail in the non-prepublished Dutch patent application NL 1016687, incorporated herein by reference. The intermediate body 27 comprises in this embodiment a first channel 28 which, adjacent the lower end, is provided on the outer side thereof with a flexible jacket 29 of a diameter such that this lower end 30 can be fittingly received in the opening 31 in the gas valve 22, in sealing engagement therewith. The lower end 30 is provided with legs 32 with which the beer valve 20 can be moved, away from the gas valve 22, such that beer can pass the beer valve 20 and can flow into the channel 28. The channel 28 is surrounded by two concentric aprons 33 and 34, of which the inner apron 33, upon pressing down of the intermediate body, is moved against the upper side of the gas valve 22 after the jacket 29 closes off the opening 31, for pressing down the gas valve 22, away from the seat 23. The outer apron 34 is provided with a flexible cladding 35 which extends outwardly at the lower end in the form of a circumferential lip 36, outside the outer apron 34, which lip 36, with the body 25 pressed down, as shown in FIG. 1, seals against an upper surface 37 of the seat 23. Thus a liquid- and gas-tight seal has been obtained between on the one hand the outer apron 34 and the tapping rod 13 and, on the other, between the gas valve 22 and the jacket 29, thus yielding a mutually separate beverage channel, in particular beer channel 28, and gas passage channel between the connecting device 15 and the inner space 38 of the container 2. The channel 28 and the two aprons 33, 34 are cylinder-shaped and concentrically arranged about the longitudinal axis L and have axial lengths decreasing from the inside towards the outside, adapted to (upon pressing down of the intermediate body 25) first press the beer valve open, whilst closing off the channel 28 against the gas valve 22, and thereupon to press the gas valve 22 open, with sealing action of the lips 36 against the seat surface 37. Provided on the outer apron 34 is an outwardly extending flange 39, which is movably confined between, on one side, a shoulder 40 above the seat surface 37 and, on the other, the underside of lugs 41 reaching inwards in the mouth of the tapping rod 13, under which lugs 41, with prior art handle-tapping heads, the handle-tapping head is secured. Due to the distance between the shoulder 40 and the underside of the lugs 41 and the thickness of the flange 39, the maximum stroke of the intermediate body 25 is limited, while the intermediate body is thereby confined as well.

As shown in FIGS. 1 and 2, on the top surface of the insert 13 a ring 71 is included which prior to initial use is attached to the intermediate body 27 by a connecting element 70 such that upon operation of the connecting device 15 for opening at least one valve the connecting element 70 is detached, in particular torn loose, from the ring 71. At the same time, the intermediate body 27 is detached from the ring 71.

Figure 4:
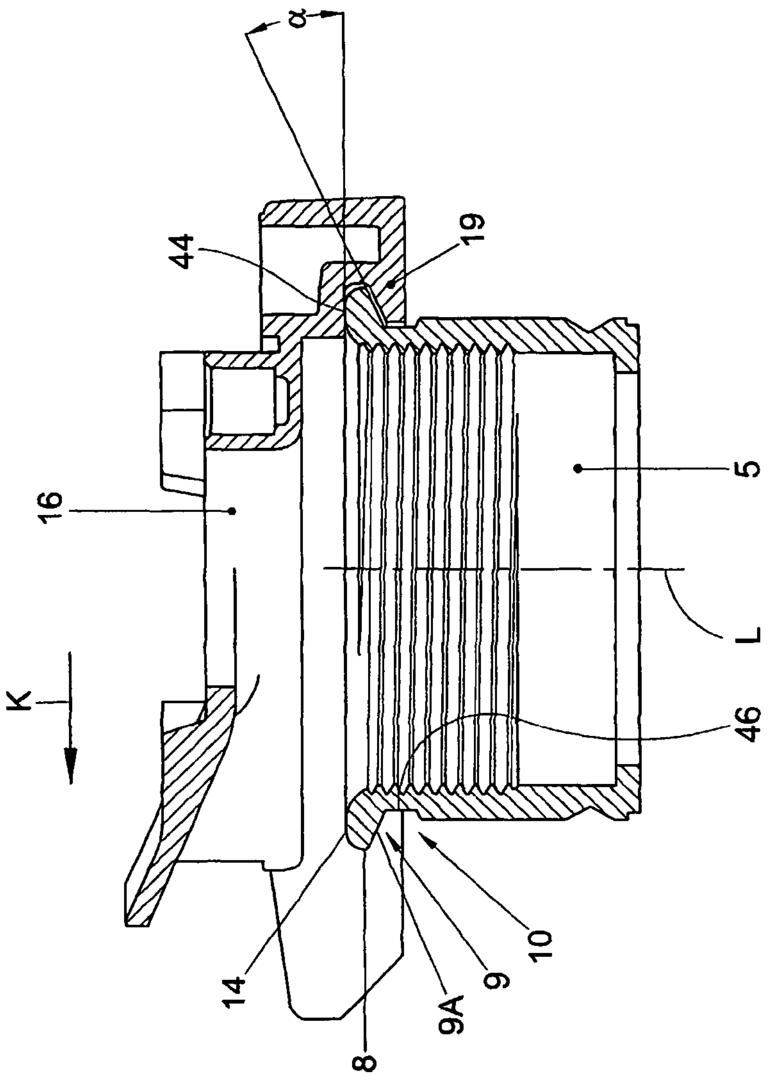
FIGS. 3 and 4 show, in sectional front and side view, respectively, a neck of a tapping keg according to the invention having thereon the base of a connecting device.
Figure 3:
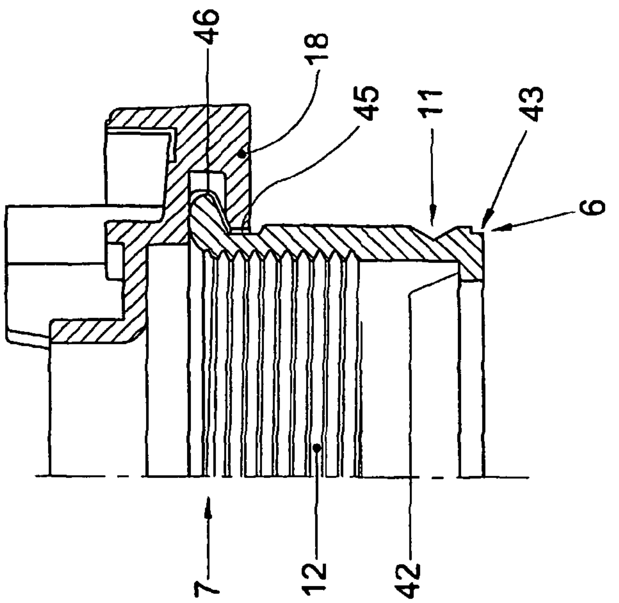
Figure 7:
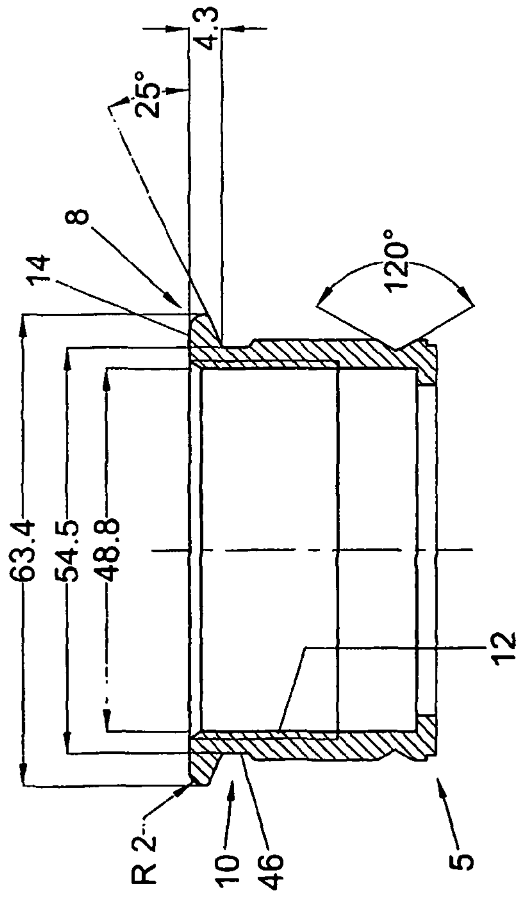
FIG. 7 shows, in sectional side elevation, a neck of a tapping keg according to the invention.

In FIGS. 3 and 4, a neck 5 and a base 16 of a connecting device 15 are shown, in sectional front view and side view, respectively, with omitted tapping rod and intermediate body. Clearly visible is the screw thread 12 in which the tapping rod 13 can be screwed until it abuts against an inwardly reaching edge 42. The neck is substantially cylinder-shaped and is provided, adjacent the first end 6, with a circumferential notch 43 for simplifying placement and welding of the neck in the container 2. Provided directly above the second end 6 is the second groove 11, which provides for a locally reduced wall thickness, thereby preventing, at least reducing, thermal conduction during welding, so that the roundness of the neck and the screw thread is protected. This second slot has an included angle of, for instance, about 120°, as shown in FIG. 7, so that it is particularly simple to clean. The upper, second end 7 is formed by the outwardly reaching flange 8, which has been rounded off at the top in a manner known per se, such that it can link up with known filling devices, cleaning devices and the like. At the underside, the flange is provided with an inclined surface 9 having at least a planar central part 9A. The angle of inclination α measured between the top surface 14 and the inclined surface 9A has been selected such that a centering action is obtained. In the exemplary embodiments shown, the angle has been selected between 10 and 45°, more particularly between 20 and 30°. In the preferred embodiment shown in FIG. 7, this angle is approximately 25°. As is clearly apparent, the slot 18 is designed such that the base 16 can be slid in the direction K approximately at right angles to the longitudinal axis L of the neck onto the flange 8, from right to left in FIG. 4, at right angles to the plane of the drawing in FIG. 3. In cross section, the slot 18 has a shape such that it can surround the flange 8 with relatively little clearance. When the base 16 rests by way of the top surface 44 of the slot 18 on the top surface 14 of the neck 5, the clearance between the inclined surface 9 at the underside of the flange 8 and the inclined surface 19 of the slot 18 is particularly small, in particular a few tenths of millimeters. In the preferred embodiment shown, this clearance is between 0.4 and 0.5 mm, so that a particularly good sliding fit is obtained. This enables particularly accurate placement of the base 16. Specifically when using an intermediate body 25, this is particularly advantageous because gas is to be introduced via the intermediate body and the intermediate body must therefore be engaged and operated by the piston 25 with particular accuracy.

In order for the base 16 to be positioned still better, it is preferred that directly under the flange 8 a groove 10 be provided which passes around the neck 5 and is open towards the outside. The groove has a depth (at right angles to the longitudinal axis L) of, for instance, at least 1 to 2 mm, and a height of, for instance, a few mm, the slot 18 being so dimensioned that, with the base 16 fitted, as shown in FIGS. 3 and 4, the inner longitudinal edge 45 of the base 16 reaches into the groove 10, at, for instance, approximately 0.5 to 0.7 mm from the bottom surface 46 thereof, so that the contact surface between the inclined surface 9 and the lower surface 19 is enlarged. What is moreover achieved with such an assembly is that the base 16 can only be placed on a neck which is provided with such a groove 10, thereby ensuring that only suitable combinations of necks 5, and hence containers 2, and connecting devices 15, are obtained.

In FIG. 7, a preferred embodiment of a neck 5 according to the invention is shown, with a number of dimensions inscribed. Adjacent the bottom surface 46 of the groove 10, the diameter of the neck 5 is between 52 and 56 mm, and is preferably approximately 54.5 mm. The inside diameter of the neck is preferably the standard diameter of approximately 48.8 mm, with standard screw thread 12 tapped therein. The outside diameter of the flange 8 is also a standard size, approximately 63.4 mm, such that it can be used with standard filling devices and cleaning devices. The top surface 14 is rounded off on the outer edge with a radius of approximately 2 mm, on the inside with a radius of approximately 4 mm. The inclined bottom surface 9 extends into the groove 10 and constitutes an upper wall part thereof. The distance between the end of the inclined surface 9 that is disposed in the groove and the top surface 14 of the neck 5 is approximately 4.4 mm. The opposite end has been rounded off to prevent damage. Of course, the groove 10 can also have a different height, in the longitudinal direction of the neck, for instance virtually the entire height of the neck 5 below the flange 8.

The above-described dimensioning of the preferred embodiment shown in FIG. 7 should not be construed as being limitative in any way.

Figure 6:
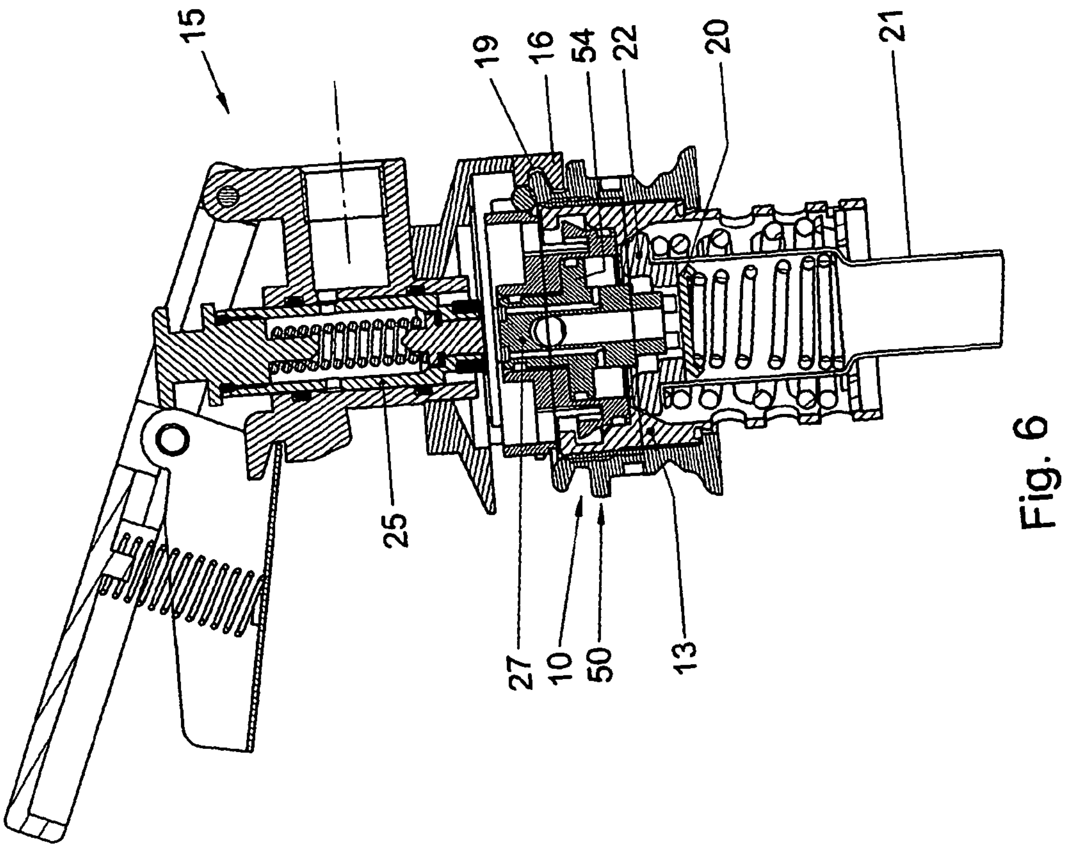
FIGS. 5 and 6 show, in sectional side elevation, a relevant portion of a second embodiment of an assembly of a tapping keg and connecting device according to the invention, in open and closed condition, respectively.
Figure 5:
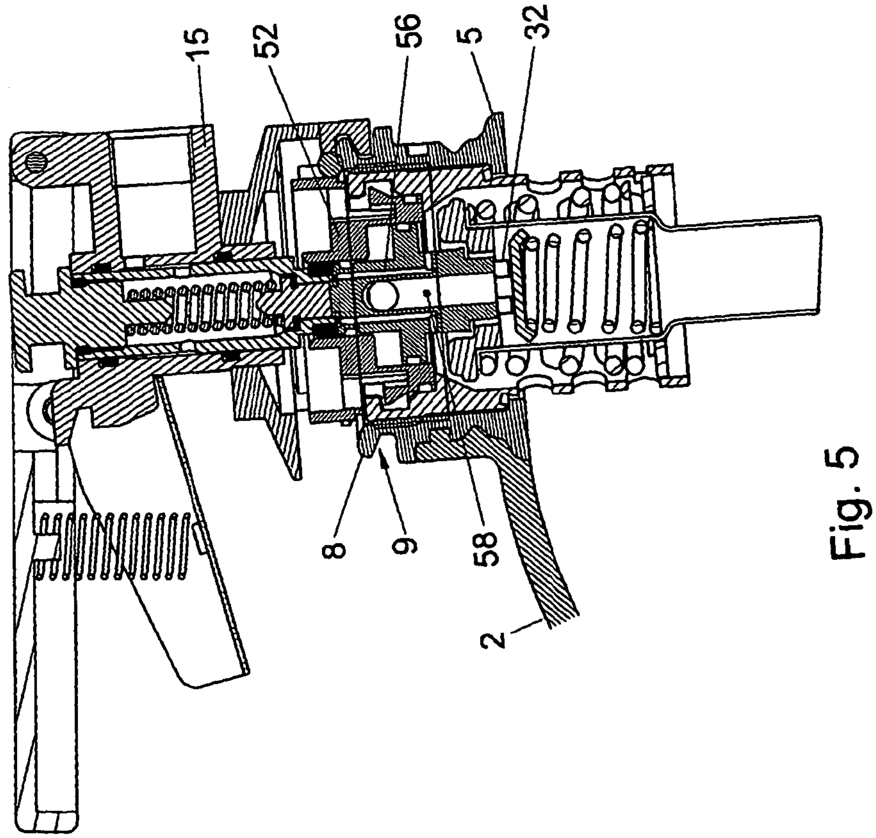

FIGS. 5 and 6 show an alternative embodiment of an assembly according to the invention, at least a relevant portion thereof, in sectional elevation. In this embodiment, a neck 5 is provided which can be constructed of, for instance, metal or plastic and may be secured in a container 2, for instance as schematically represented in FIG. 5 on the left side, for instance cast in and/or welded, clamped or otherwise secured. In this embodiment, the groove 10 is provided under the flange 8, which flange is again designed with an inclined planar bottom surface 9. Provided directly under the groove 10 is a projecting edge 50 against which abuts the material of the container 2. Of course, this edge 50 can also be omitted. A tapping rod 13, as described earlier, has again been secured in the neck 5 with screw thread. A connecting device 15 in the form of a known handle-tapping head is provided with a connecting element 16 as described earlier, which connecting element has been slid over the flange 8 into the groove 10 for coupling with the neck 5. The flange 8 again constitutes second coupling means; the connecting element 16 with the slot 19 first coupling means.

In this embodiment, again an intermediate body 27 is included between the valves 20, 22 in the tapping rod 13 and the connecting device 15, in particular a piston 25. In this embodiment, the intermediate body 27 is of two-part design, provided with a stationary part 52, and a part 54 movable within the part 52, the part 54 being provided with gas passages 56 and a beer passage 58 which terminates between legs 32. In FIG. 5, the connecting device 15 has been pressed down and secured in a manner known per se, such that the beer and gas valve 20, 22 are open. In FIG. 6 the valves 20, 22 are shown in closed position.

Figure 8:
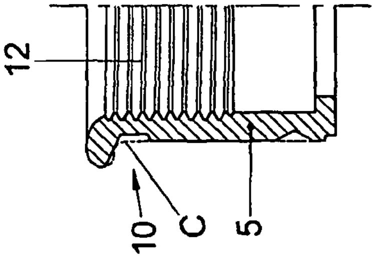
FIG. 8 shows a portion of the neck according to FIG. 7 in which the contour of a standard neck of a tapping keg has been inscribed with broken lines.

In FIG. 8 a neck 5 is shown in part, in longitudinal cross section, having inscribed therein in broken lines, at least adjacent the groove 10, the contour C of a conventional neck 5 of a tapping keg. It is clear that by material-removing machining, from the standard neck, a neck according to the invention, at least as shown in the drawings, can be formed.

Figure 9:
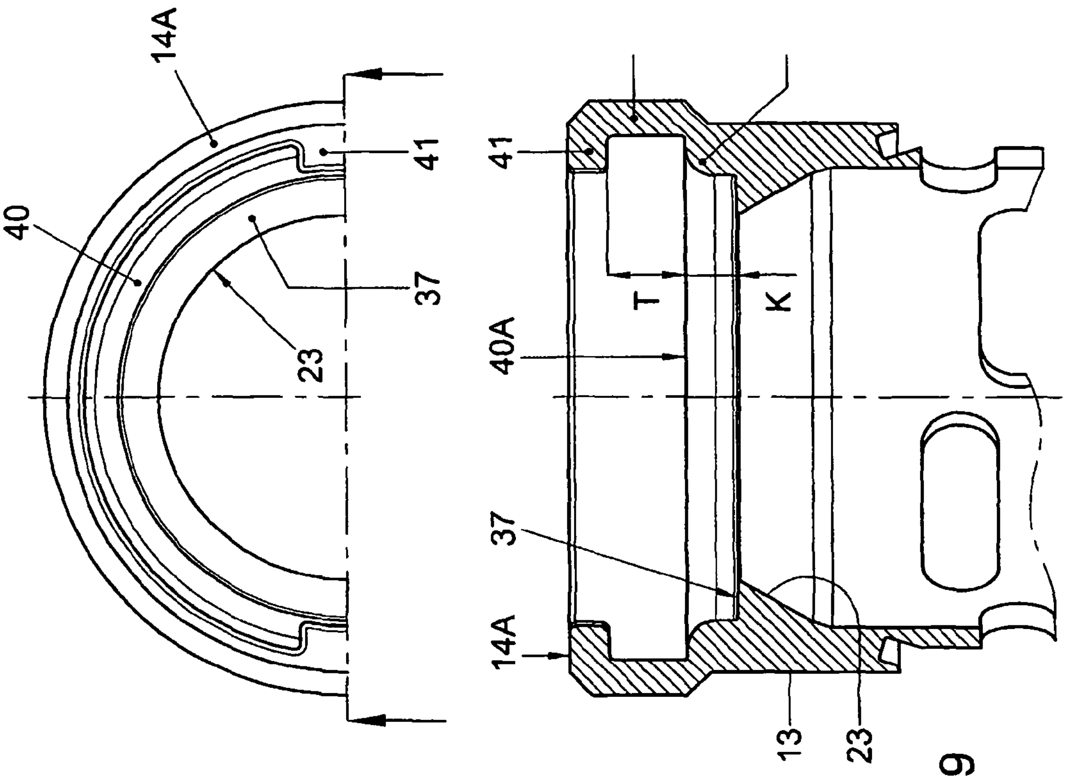
FIG. 9 shows, in sectional side elevation and top plan view, respectively, an upper end of a tapping rod according to the invention, with valve assembly and riser pipe removed.

In FIG. 9, there is shown in top plan view, and in longitudinal cross section along the line A-A, an upper end of a tapping rod 13 according to the invention, with omitted valves and riser tube. Clearly visible are the two lugs 41, extending inwards from a circumferential wall part 60, near or in the top surface 14A of the tapping rod 13. At a distance T below the underside of the lugs 41 begins a shoulder 40, which passes round and, in the direction away from the lugs 41, has been rounded off with a radius of approximately 2.5 mm, which shoulder on the other side links up with the seat surface 37 above the seat 23. The distance between the upper side 40A of the shoulder 40, facing up in FIG. 9, and the seat surface 37, which distance is indicated by K, in this embodiment is less than 5 mm and preferably approximately 4 to 4.1 mm, such that the distance T is slightly increased with respect to existing tapping rods 13. A tapping rod according to FIG. 9 can be simply obtained through material-removing machining of the known tapping rod. Optionally, the distance T could also be enlarged by turning off the lugs 41. By reducing the size K, at least increasing the size T, the possible stroke of the intermediate body 27 is increased to some extent, such that precisely the desired order of opening the beer valve 20 and gas valve 22 and seal against the tapping rod can be obtained. The space between the shoulder 40 and the outer apron 34 has been selected such that the lip 36 can be received between them, with the intermediate body pressed down, as shown in FIG. 1. The distance T is preferably approximately 8 mm, at least more than the usual 6.8 mm.

With an assembly according to the invention, the connecting device is preferably secured on a flange which forms an integral part of the tapping keg, in particular of the neck. However, the flange can also form part of a tapping rod which has been detachably placed in the neck of the tapping keg. Preferably, conventional safety means have then been provided for preventing the tapping rod from turning loose from the neck.

The invention is not in any way limited to the exemplary embodiments shown in the description and drawings. Many variations thereon are possible within the framework of the invention outlined by the claims. In particular, all combinations of tapping kegs, connecting devices, necks, tapping rods and intermediate body as described and shown are understood to fall within the scope of the invention.

In the exemplary embodiments shown, in each case a container is shown in which a beverage, liquid or other fluid may be contained directly. It will be clear, however, that a comparable assembly can simply be designed with a bag-in-container type tapping keg. Also, a tapping keg with a neck according to the invention can be readily used with other connecting devices, at least differently operable connecting devices. Furthermore, an assembly according to the invention can also be provided with a valve assembly in a different manner, and the intermediate body can be omitted, with the valves being operated directly by the handle-tapping head, at least the piston. The dispensing duct can also be connected directly via the handle-tapping head. In the exemplary embodiments shown, the inclined surface 9 of the flange 8 is of wholly planar design. It will be clear that small profilings such as undercuts or protrusions are also possible.

The invention claimed is:

1. An assembly of a tapping keg with a neck and a connecting device for placement on said neck, at least one valve being provided in the neck, in coupled condition, an intermediate body being located between the connecting device and the valve, the connecting device including pressure means, the pressure means in coupled condition being operable to press the intermediate body to open the valve, the neck being provided with an outwardly reaching flange with a top surface and a bottom surface, the bottom surface being obliquely inclined with respect to the top surface, at least a portion of the bottom surface defining a surface of a frustum of a cone, the connecting device having a substantially horse shoe-shaped connecting element, provided with a slot by way of which the connecting element is slidable, in a direction substantially parallel to the top surface of the flange, over said flange, the side of said slot facing the bottom surface during use comprising a surface which is inclined at an angle which is at least virtually equal to the angle of inclination of said bottom surface and, in coupled condition, at least abuts against said surface of a frustum of a cone, the connecting device being disengagable from the intermediate body, the connecting device, including the pressure means, being operable so that, during use, the connecting device, including the pressure means, does not contact liquid being dispensed from the tapping keg, wherein the intermediate body includes a channel through which flows, during use, a liquid being dispensed from the tapping keg, the connecting device being separatable from the intermediate body so that the connecting device can be reused on another tapping keg.

2. The assembly according to claim 1, wherein the angle of inclination of said inclined surface is between 45 and 10 degrees, measured between the top surface of the neck and said inclined surface.

3. The assembly according to claim 1, wherein in the neck an insert has been arranged, in which insert the valve is included, which insert is provided with a top surface, while on the top surface of the insert a ring is included which prior to initial use is attached to the intermediate body by a connecting element, such that upon operation of the connecting device for opening the valve the connecting element is detached from the ring.

4. The assembly according to claim 1, wherein the intermediate body is included within the neck and comprises an outwardly extending edge, adjacent a side thereof facing the valve, while within the neck a first shoulder and a seat surface are provided, against which said edge abuts when the valve has been opened by the intermediate body, while the distance between the upper side of the first shoulder and the seat surface, measured in axial direction, is maximally 5 mm.

5. The assembly according to claim 1, wherein to the intermediate body a hose is connected for passing beverage stored in the keg out of the keg, without this beverage contacting the connecting device.

6. The assembly according to claim 1, wherein the neck is substantially cylinder-shaped, wherein directly under said flange, on the outer side of the neck, a groove is provided which extends along at least a part of the circumference, while in coupled condition at least a portion of the connecting element extends into the groove, wherein the diameter of the neck, measured adjacent a bottom surface of the groove, is minimally approximately 52 mm and maximally approximately 56 mm, wherein said horse shoe-shaped connecting element has an inner diameter between approximately 56 and 52 mm.

7. The assembly according to claim 6, wherein the groove, viewed in the longitudinal direction of the neck, has a height which corresponds at least to the thickness of the part of the connecting element that extends therein in coupled condition.

8. The assembly according to claim 6, wherein the depth of the groove is at least 1.5 mm.

9. The assembly according to claim 6, wherein the groove extends around the entire circumference of the neck.

10. An assembly of a tapping keg with a neck and a connecting device for placement on said neck, at least one valve being provided in the neck, the neck having a longitudinal axis, in coupled condition, an intermediate body being located between the connecting device and the valve, the connecting device including pressure means, the pressure means in coupled condition being operable to press the intermediate body to open the valve, the neck being provided with an outwardly reaching flange with a top surface and a bottom surface, the bottom surface being obliquely inclined with respect to the top surface, at least a portion of the bottom surface defining a surface of a frustum of a cone, the connecting device having a substantially horse shoe-shaped connecting element, provided with a slot by way of which the connecting element is slidable, in a direction substantially perpendicular to the longitudinal axis of the neck, over said flange, the side of said slot facing the bottom surface during use comprising a surface which is inclined at an angle which is at least virtually equal to the angle of inclination of said bottom surface and, in coupled condition, at least abuts against said surface of a frustum of a cone, the connecting device being disengagable from the intermediate body, the connecting device, including the pressure means, being operable so that, during use, the connecting device, including the pressure means, does not contact liquid being dispensed from the tapping keg, wherein the intermediate body includes a channel through which, during use, a liquid can flow, being dispensed from the tapping keg, the connecting device being separatable from the intermediate body so that the connecting device can be reused on another tapping keg.

* * * * *